(12) United States Patent
Marvin et al.

(10) Patent No.: US 11,585,999 B2
(45) Date of Patent: *Feb. 21, 2023

(54) OPTICAL CABLE HAVING A BUFFER TUBE WITH FLEXIBLE RIBBON

(71) Applicant: Prysmian S.p.A., Milan (IT)

(72) Inventors: Ray Lance Marvin, Hickory, NC (US); James David Holder, Hickory, NC (US); Michael Gray Doub, Claremont, NC (US)

(73) Assignee: Prysmian S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,925

(22) Filed: Jul. 16, 2021

(65) Prior Publication Data

US 2022/0113486 A1 Apr. 14, 2022

Related U.S. Application Data

(63) Continuation of application No. 17/068,136, filed on Oct. 12, 2020, now Pat. No. 11,099,346.

(51) Int. Cl.
*G02B 6/44* (2006.01)

(52) U.S. Cl.
CPC ......... *G02B 6/4477* (2013.01); *G02B 6/4403* (2013.01); *G02B 6/448* (2013.01); *G02B 6/4434* (2013.01)

(58) Field of Classification Search
CPC .. G02B 6/4477; G02B 6/4403; G02B 6/4434; G02B 6/448
USPC .......................................... 385/102
See application file for complete search history.

(56) References Cited

U.S. PATENT DOCUMENTS

| 5,390,273 | A | 2/1995 | Rahman et al. |
| 10,018,796 | B1 | 7/2018 | Cook et al. |
| 11,099,346 | B1* | 8/2021 | Marvin ................ G02B 6/4477 |
| 2012/0243841 | A1 | 9/2012 | Hurley et al. |
| 2015/0177471 | A1* | 6/2015 | Bringuier ............. G02B 6/4494 |
| | | | 385/103 |
| 2017/0031121 | A1 | 2/2017 | blazer et al. |
| 2020/0012059 | A1 | 1/2020 | Wells et al. |
| 2020/0126690 | A1 | 4/2020 | Sirin et al. |
| 2020/0271881 | A1 | 8/2020 | Sirin et al. |
| 2020/0319419 | A1 | 10/2020 | Neveux, Jr. et al. |
| 2021/0149138 | A1* | 5/2021 | Hudson, II ............. G02B 6/443 |
| 2021/0286143 | A1* | 9/2021 | Kondapalli .......... G02B 6/4403 |

FOREIGN PATENT DOCUMENTS

| EP | 1310814 A1 | 5/2003 |
| EP | 3306368 A1 | 4/2018 |
| EP | 3614188 A1 | 2/2020 |
| EP | 3796060 A1 | 3/2021 |
| GB | 2065324 A | 6/1981 |

(Continued)

OTHER PUBLICATIONS

Extended European Search Report, EP Application No. 21201696.8, dated Feb. 23, 2022, 11 pages.

*Primary Examiner* — Jerry M Blevins
(74) *Attorney, Agent, or Firm* — Slater Matsil, LLP

(57) ABSTRACT

An optical cable includes a plurality of buffer tubes, each of the buffer tubes includes a flexible ribbon, the flexible ribbon including a plurality of optical fibers, the flexible ribbon being wrapped with a finished tape.

22 Claims, 8 Drawing Sheets

(56) References Cited

FOREIGN PATENT DOCUMENTS

| JP | 2013254001 A | 12/2013 |
|----|--------------|---------|
| WO | 9418591 A1 | 8/1994 |
| WO | 2020075734 A1 | 4/2020 |

* cited by examiner

OPTICAL CABLE HAVING A BUFFER TUBE WITH FLEXIBLE RIBBON

CROSS-REFERENCE TO RELATED APPLICATIONS

This application claims the benefit of U.S. patent application Ser. No. 17/068,136, filed on Oct. 12, 2020, which application is hereby incorporated herein by reference.

TECHNICAL FIELD

The present invention relates generally to optical cables and, in particular embodiments, to an optical cable having a buffer tube with flexible ribbon.

BACKGROUND

Optical fibers are very small diameter glass stands capable of transmitting an optical signal over great distances, at very high speeds, and with relatively low signal loss relative to standard copper wire networks. Optical cables are therefore widely used in long distance communication and have replaced other technologies such as satellite communication, standard wire communication, etc. Besides long distance communication, optical fibers are also used in many applications such as medicine, aviation, computer data services, etc.

Optical buffer tubes within an optical cable include a plurality of loose optical fibers. There is a growing need in many applications for optical cables that are able to transfer high data rates while taking up minimum space. Such a need may arise in servers where space for the optical fiber is a critical limiting factor. As the size of optical cables is getting smaller so are the diameters of the buffer tubes.

The performance of optical fibers within the optical cables is very sensitive to bending, buckling, compressive stress, and tensile strain. One way to provide the desired characteristics to protect against tensile strain is to incorporate strength elements within the buffer tube along with the optical fibers.

In order to facilitate mass fusion splicing, it is desirable to replace the loose optical fibers with one or more flexible ribbons. Flexible ribbons take up a minimal amount of space within a buffer tube because they are designed so that they can be easily rolled or folded to create a compact bundle of optical fibers and be easily unrolled or unfolded in a planar configuration for mass fusion splicing.

SUMMARY

In an embodiment, an optical cable includes a plurality of buffer tubes, each of the buffer tubes includes a flexible ribbon, the flexible ribbon including a plurality of optical fibers, the flexible ribbon being wrapped with a finished tape.

In an embodiment, an optical cable includes a plurality of buffer tubes, each of the plurality of buffer tubes includes a plurality of flexible ribbons arranged together in a core, each of the plurality of flexible ribbons including a plurality of optical fibers, an outer finished tape spiraled around an outer surface of the core, and a buffer tube jacket surrounding the outer finished tape.

In an embodiment, a device includes one or more flexible ribbons comprising a plurality of optical fibers; a finished tape wrapping around the one or more flexible ribbons; and a jacket disposed around the finished tape.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1F illustrate an optical cable in accordance with an embodiment of the present invention, wherein FIG. 1A illustrates a cross-sectional view of the optical cable, FIG. 1B illustrates a projection view of an array of optical fibers within a flexible ribbon, FIG. 1C illustrates a corresponding cross-sectional area of the array of optical fibers illustrated in FIG. 1B, FIG. 1D illustrates a side-view of a flexible ribbon after the flexible ribbon is wrapped in tape, FIG. 1E illustrates a corresponding cross-sectional view of an array of optical fibers within a flexible ribbon in a rolled configuration after the flexible ribbon is wrapped in tape, and FIG. 1F illustrates a side-view of a flexible ribbon after the flexible ribbon is wrapped in an additional tape;

DETAILED DESCRIPTION OF ILLUSTRATIVE EMBODIMENTS

Applicant has found that using loose strands of semi-finished yarns in a buffer tube with a flexible ribbon may cause the optical fibers to attenuate and encumber the flexible ribbon's ability to facilitate mass fusion splicing.

In the production of optical fiber buffer tubes that do not include flexible ribbons, a plurality of loose optical fibers is arranged in a bundle within the buffer tube. One way to design these buffer tubes with improved strain relief characteristics may be to use one or more loose strands of semi-finished yarns within the buffer tube. However, the loose strands of semi-finished yarns are made out of many small filaments that are easily separable.

Optical cables using flexible ribbons offer improved packing density compared to optical cables using non-flexible ribbons. Flexible ribbons take up a minimal amount of space within a buffer tube because they are designed so that they can be easily rolled or folded to create a compact core of optical fibers and be easily unrolled or unfolded. Therefore, it is desirable to include one or more flexible ribbons into buffer tubes.

However, for buffer tubes that include flexible ribbons, using loose strands of semi-finished yarns for strain relief produces some undesired results. In order to allow optical fibers within a flexible ribbon to be rolled or folded and unrolled or unfolded the construction of a flexible ribbon matrix may also include a plurality of intermittent bonds between adjacent optical fibers. The inventors of this application identified that when the small strands of semi-finished yarns come into contact with a flexible ribbon, the small strands make their way between the portions of the optical fibers where the intermittent bonds are absent. The small yarn filaments are thus susceptible to becoming entangled with or sticking to the intermittent bonds formed between the optical fibers. This undesired entanglement or sticking can induce the optical fibers to attenuate. In some situations, the undesired entanglement can cause individual intermittent bonds to break and prevent a ribbon's ability to be unrolled or unfolded to a planar position for mass fusion splicing.

Embodiments of the present application advantageously overcome the above issues by wrapping flexible ribbons with a finished tape which allows for flexible ribbons to be easily folded or rolled into a compact core and unfolded or unrolled to a planar configuration for mass fusion splicing. Accordingly, one or more embodiments will be described using cross-sectional FIGS. 1A-1F. Further embodiments of using a finished tape for strain relief in buffer tubes with flexible ribbons will be described in FIGS. 3-5.

Figure 1A:
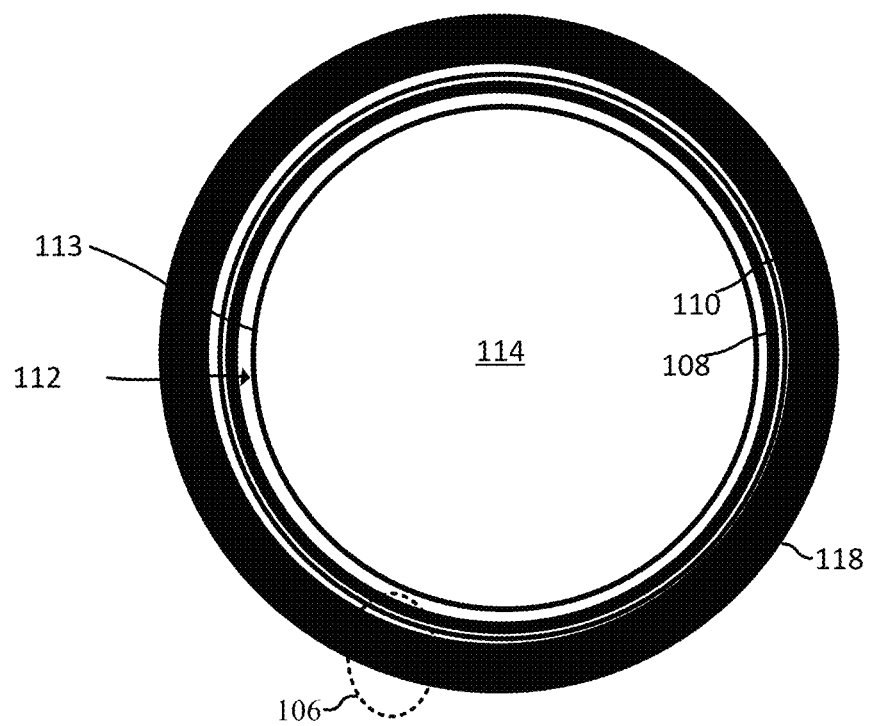
Figure 1B:
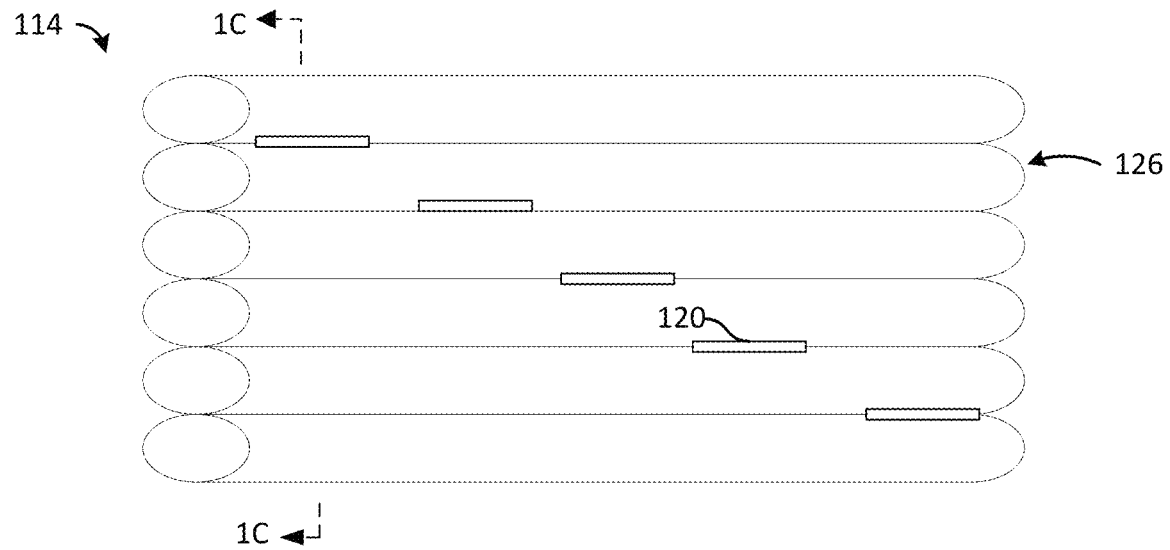
Figure 1C:
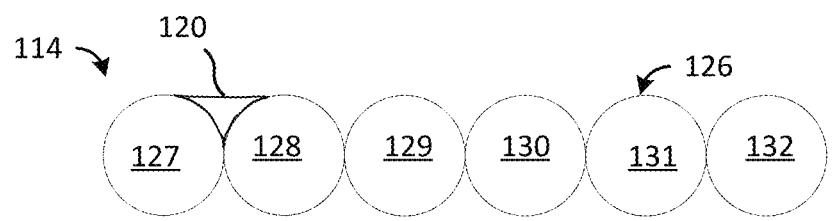
Figure 1D:
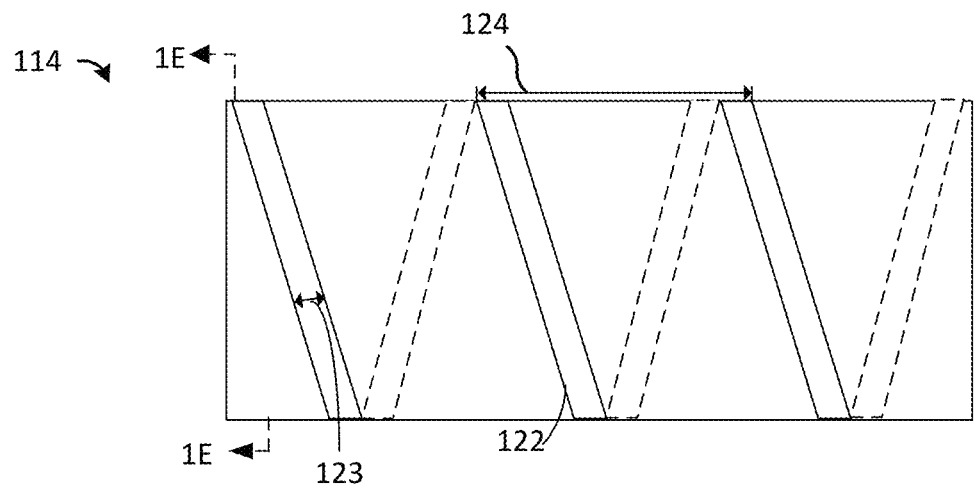
Figure 1E:
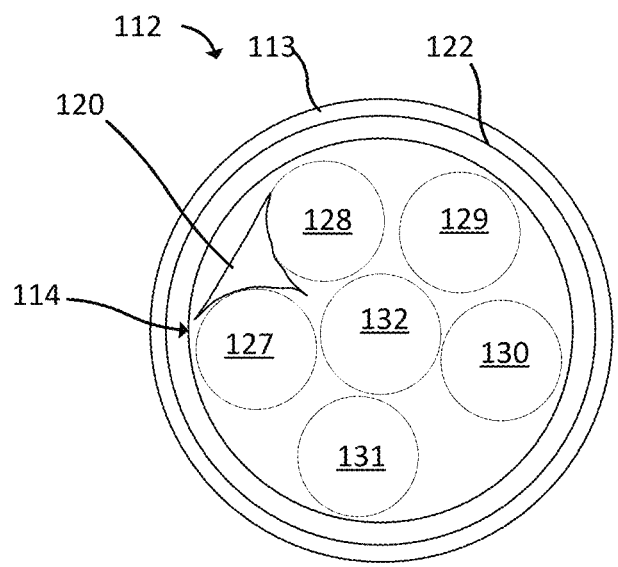
Figure 1F:
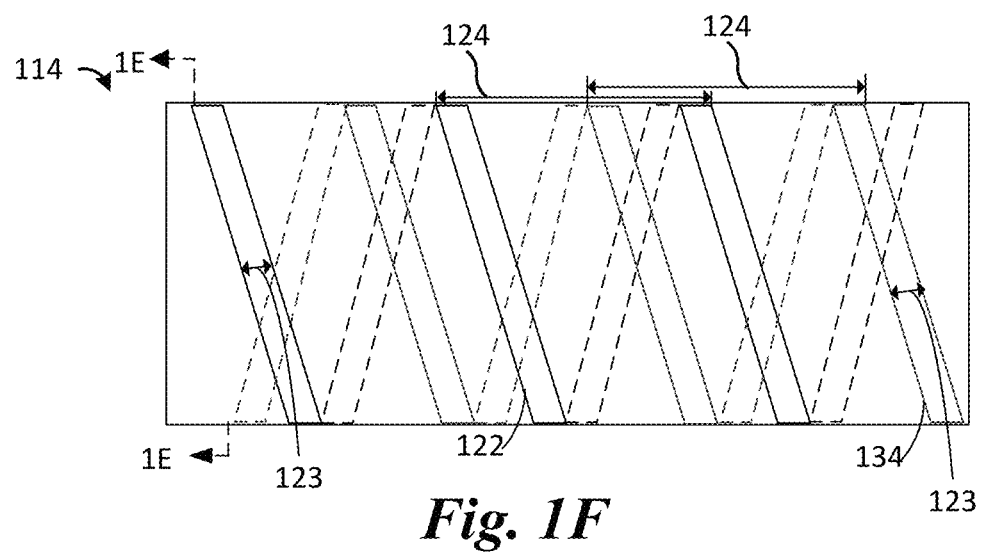

FIGS. 1A-1F illustrate an optical cable in accordance with an embodiment of the present invention, wherein FIG. 1A illustrates a cross-sectional view of the optical cable, FIG. 1B illustrates a projection view of an array of optical fibers within a flexible ribbon, FIG. 1C illustrates a corresponding cross-sectional area of the array of optical fibers illustrated in FIG. 1B, FIG. 1D illustrates a side-view of a flexible ribbon after the flexible ribbon is wrapped in tape, and FIG. 1E illustrates a corresponding cross-sectional view of an array of optical fibers within a flexible ribbon in a rolled configuration after the flexible ribbon is wrapped in tape, and FIG. 1F illustrates a side-view of a flexible ribbon after the flexible ribbon is wrapped in an additional tape.

Referring first to FIG. 1A, in one or more embodiments, the optical cable comprises a buffer tube 112. Although one buffer tube is shown in FIG. 1A, this number is not necessarily indicative of the total number of buffer tubes 112 that may be included in the optical cable.

The buffer tube 112 fits within an outer layer 106 of the optical cable. The outer layer 106 may include a number of layers such as an outer jacket 118, a water blocking layer 108, and an optional outer strength member no. The outer jacket 118 may comprise polyurethane, polyethylene, nylon, or other suitable material. In one embodiment, the outer cover 118 includes medium-density polyethylene, with a nominal outer jacket thickness of approximately 1 mm, so as to comply with the standards for fiber optic cables such as Telcordia, GR-20 and ICEA-640. Flame-retardant additives may also be included into the outer cover 118. The water blocking layer 108 may comprise water blocking threads, water blocking tapes, or super absorbent powder type materials.

The buffer tube 112 comprises a plurality of flexible ribbons 114 and a buffer tube jacket 113 enclosing the flexible ribbons 114. The flexible ribbons 114 run lengthwise down the buffer tube 112. In one embodiment, the buffer tube 112 may comprise a single flexible ribbon. In other embodiments, the buffer tube 112 may comprise a plurality of flexible ribbons.

In one or more embodiments, the buffer tube jacket 113 may comprise a flexible material such as flame-retardant polyvinyl chloride (PVC), polypropylene (PP), polyvinylidene fluoride (PVDF), polybutylene terephthalate (PBT), or low smoke zero halogen (LSZH) compounds. In one or more embodiments, the buffer tube jacket 113 may comprise a deformable material. The wall thickness of the buffer tube jacket 113 is maintained to enable the flexibility of the plurality flexible ribbons 114 within the buffer tube 112. In one or more embodiments, the buffer tube 112 may have a diameter between 1 mm and 5 mm, preferably 2.0 mm in one embodiment. In one or more embodiments, the buffer tube jacket 113 may have a wall thickness between 0.1 mm and 2 mm, preferably 0.35 mm in one embodiment. The plurality of flexible ribbons 114 run lengthwise along the buffer tube 112. Advantageously, although the buffer tube jacket 113 may comprise a flexible material, the use of the tape in various embodiments helps to minimize pressure points on the buffer tube jacket 113 by conforming the flexible ribbons 114 into a near circular shape.

Referring to FIG. 1B, as will be further described in each of the following figures, each of the flexible ribbons 114 include an array comprising a plurality of optical fibers 126. The plurality of optical fibers 126 are arranged as a parallel array such that each of the flexible ribbons 114 can be arranged in a substantially planar shape, as illustrated in FIG. 1C. As shown in FIG. 1C, each of the flexible ribbons 114 may comprise a plurality of optical fibers 126 such as the first, the second, the third, the fourth, the fifth, and the sixth optical fibers 127-132. FIGS. 1B and 1C are not indicative of the total number of optical fibers 126 although only six optical fibers are shown. The flexible ribbons 114 may include any suitable number of optical fibers 126. For example, the flexible ribbons 114 may include twelve optical fibers in one illustration. The optical fibers 126 may have a diameter in a range of 100 microns to 300 microns in various embodiments. For example, in one or more embodiments, each optical fiber in a flexible ribbon may have a diameter of 170 to 190 microns, 190 to 210 microns, or 235 to 255 microns, such as 180 microns, 200 microns or 245 microns.

However, as illustrated in FIGS. 1B and 1C, bond regions 120 are arranged across each of the flexible ribbons 114 in an intermittent manner to selectively leave a large surface of the plurality of optical fibers 126 free from the bonding material that forms the bond regions 120. Accordingly, each optical fiber is attached to a first neighboring optical fiber through the bond regions 120, which do not extend into the second neighboring optical fiber. Consequently, the plurality of optical fibers 126 maintain a large degree of freedom and each of the flexible ribbons 114 can be effectively folded or rolled into compact bundles, resulting in an improved packing density. In addition, each of the flexible ribbons 114 can be effectively unfolded and unrolled back into a substantially planar configuration, as shown in FIG. 1C, required for mass fusion splicing.

As explained above, one way to provide strain relief in an optical fiber buffer tube is to incorporate strands of loose semi-finished yarns within the buffer tube. Problematically, this does not work for buffer tubes that include flexible ribbons because the semi-finished yarns easily separate, and may make their way through the portions of the plurality of optical fibers 126 where the intermittent bonding regions 120 are absent and become entangled with the material that forms the bonding regions 120. As a result, the plurality of optical fibers 126 are attenuated and may cause the bond regions 120 to break which hinders the flexible ribbons 114 from being unrolled into a planar shape for mass fusion splicing.

Advantageously, as illustrated in FIG. 1D, flexible ribbons 114 may be rolled or folded and may be wrapped with a finished tape 122 to form a compact core within the buffer tube. Individual fibers of the flexible ribbon are not illustrated in FIG. 1D. In one or more embodiments, the finished tape 122 may comprise a flexible tape such as a finished aramid tape constructed with aramid filaments arranged in a common matrix in a planar configuration, for example. In other embodiments, the finished tape 122 may comprise any plastic material or reinforced plastic material such as polyethylene, polyester, polyamide, and nylon. One advantage of applying the finished tape 122 is that the filaments that comprise the finished tape 122 are not easily separable, and therefore, small filaments are unable to make their way between the adjacent optical fibers and entangle the bonding regions formed between optical fibers. In contrast, although a semi-finished yarn when wrapped around a bundle of fibers may flatten and appear as a tape-like shape around the bundle, the reinforcing strands in such semi-finished yarns are easy separated and insert themselves between individual fibers, which makes them not suitable for application with flexible ribbons. Advantageously, the finished tape 122 will not separate into individual strands.

Referring to FIG. 1D, in one or more embodiments, the finished tape 122 may have a rectangular cross-sectional shape and may be applied over the flexible ribbon 114 in a helical, longitudinal, or a contra-helical fashion. In one embodiment, the finished tape 122 may be applied over the ribbons 114 in a helical fashion. In one embodiment, a material thickness of the finished tape 122 may be between 0.01 mm and 0.2 mm, with a lay length 124 in a range between 10 cm to about 100 cm, in one embodiment between 25 cm to 55 cm. In one embodiment, the thickness of the finished tape 122 may be between 0.8 mm and 0.12 mm. In one or more embodiments, the finished tape 122 may have a width 123 in a range 1.5 mm to 5 mm, or roughly 20 to 40 times greater than its thickness. This range of ratio between the width and the thickness helps to ensure that the finished tape 122 is flexible enough so that the it can easily conform around the flexible ribbons 114 without exerting excessive force on the optical fibers that may otherwise influence optical performance. Additionally, the range of the ratio between the width and the thickness ensures the finished tape 122 is not narrow enough to work its way between voids of adjacent fibers in the buffer tube 112 while still limiting its width to preserve free space within the buffer tube 112.

In one or more embodiments, the tape characteristics may be selected based on the tensile strength requirements of the buffer tube or, in the case where an optical cable is comprised of a plurality of buffer tubes, the tape may be selected based on the tensile strength requirements of the optical cable. For example, an optical cable with 96 fibers may have a higher tensile strength requirement than an optical cable with 12 fibers, therefore it may be advantageous to select a higher strength tape to meet the necessary tensile demands. Given the necessary strength attributes, a practical tape thickness and tape width may be chosen to ensure the preferential width to thickness ratio as described above. In various embodiments, the finished tape 122 may be applied freely or using equipment that provides more precise tension control. If the finished tape 122 is applied with too much tension, it may exert unwanted stresses on the optical fibers. On the other hand, if the finished tape 122 is applied with too little tension, it may be difficult to maintain a compact core of flexible ribbons 114 down the length of the buffer tube 112. Advantageously, the flexibility and the lay of the finished tape 122 along with the lay-length 124, the width 123, and the thickness of the finished tape 122 are selected in a manner such that the finished tape 122 maintains the compact core of flexible ribbons 114 down the length of the buffer tubes 112, provides strain relief for the buffer tubes 112, and maintains the mechanical ability of the flexible ribbons 114 to be rolled and folded and unrolled and unfolded when accessed from the buffer tubes 112.

In various embodiments, each of the flexible ribbons 114 can be rolled or folded into compact cores having a densely packed circular configuration, as shown in FIG. 1E. In one or more embodiments, the conformed flexible ribbons 114 may have a non-circular or irregular shape. Advantageously, as described above, the flexibility of the finished tape 122 allows for the flexible ribbons 114 to be rolled or folded into a compact core shown in FIG. 1E, while maintaining the mechanical properties of the flexible ribbons 114. One advantage of this is that it allows the flexible ribbons 114 to be unrolled or unfolded back into a planar configuration when accessed from the end of the buffer tube, allowing for mass fusion splicing.

Referring to FIG. 1F, in one or more embodiments, an additional tape 134 may be applied to the flexible ribbons 114 to equalize the strain across the plurality of optical fibers 126. In one or more embodiments, the additional tape 134 may comprise the same dimensions (i.e. the material thickness, the width 123, and the lay length 124) as the finished tape 122. In one or more embodiments, the additional tape 134 may be applied in the opposite direction as the finished tape 122. For the example, the finished tape 122 may be applied in a clockwise helical manner and the additional tape 134 may be applied in a counter-clockwise helical manner. The additional tape 134 may comprise the same material and may be applied in the same manner as the finished tape 122 so long as it is applied in the opposite direction as the finished tape 122. By having two tapes coiling in opposite directions, the shear stresses on the optical fibers may be more uniform.

Although FIGS. 1A-1F illustrate a single-unit stand alone optical cable, in various embodiments the optical cable design may include multiple buffer tubes stranded around a central strength member.

Figure 2:
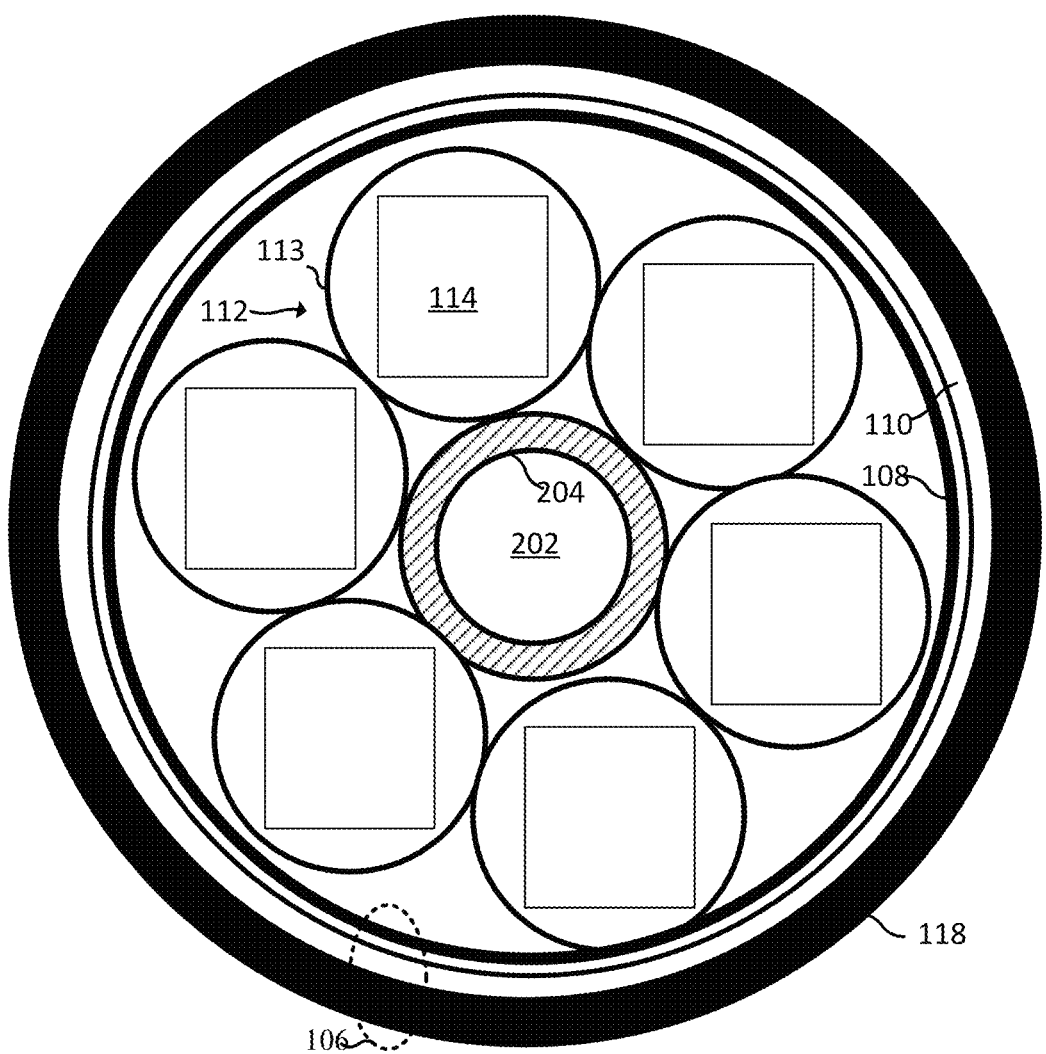
FIG. 2 illustrate a cross-sectional view of an optical cable using taped flexible ribbons in accordance with an embodiment of the present application.

FIG. 2 illustrates a different type of optical cable in accordance with an embodiment of the present application, where the optical cable comprises a central strength member and a plurality of buffer tubes including taped flexible ribbons.

Embodiments of the present invention are applicable to various types of optical cables and are intended to be constrained to a specific type of optical cable. Specifically, any type of cable that includes a buffer tube may include the embodiments described in this application. This includes not only optical cables but also hybrid cables in various embodiments. One such illustration of an optical cable is shown in FIG. 2 in which a plurality of buffer tubes is formed around a central core.

Referring to FIG. 2, a central region of the optical cable comprises a central strength member 202 surrounded by a conventional upjacket 204. The central strength member 202 provides mechanical integrity of the cable when experiencing heavy stress. For example, during installation the cables may be put under significant strain. The central strength member 202 is a rigid material and is the primary anti-buckling element of the cable. The central strength member 202 resists cable contraction at low temperatures and prevents optical fiber buckling. The central strength member 202 prevents the cable from being compressed and provides a primary clamping point for hardware used to connect to the optical cable for splicing and routing enclosures.

The central strength member 202 may comprise metallic elements, glass reinforced composite rods, aramid reinforced composite rods, or composite rods made of some other high modulus, low coefficient expansion material such as carbon fiber.

In one or more embodiments, the central strength member 202 may be enclosed with an upjacket 204. In other embodiments, the upjacket 204 may be a deformable material. The upjacket 204 may comprise a polymer such as polypropylene, a material similar to the material of the buffer tube jacket 113, or other polymetric materials such as cellular foam polymer like cellular impact modified nucleated polypropylene, for example. The upjacket 204 functions to maintain the proper outer diameter of the central strength member 202 required for the quantity and size of buffer tubes 112 required for the optical cable. The upjacket 204 also functions to assist in maintaining cable rigidity within a reasonable range and lowers the overall cost of the optical cable. However, the thickness of the upjacket must be limited to avoid introducing thermal stress onto the central strength member 202. In various embodiments, the diameter of the upjacket may be greater than the diameter of the central strength member. In one or more embodiments, the central strength member 202 may not include an upjacket 204 because the buffer tubes 112 provide sufficient packing density and relief from the built in stress of the optical cable.

A plurality of buffer tubes 112 surround the central strength member 202 in a concentric row such that the buffer tubes 112 fit within an outer cover 106. Although six buffer tubes are shown surrounding the central strength member, this is not indicative of the number of buffer tubes 112 that may be included within an optical cable. For example, in one or more embodiments, two concentric rows of buffer tubes 112 of equal or unequal quantities may surround the central strength member. In one or more embodiments, additional strength members comprising the same material as the central strength member 202 may be formed concentrically around the central strength member 202 between the buffer tubes 112 in either of the concentric rows.

In one or more embodiments, where each of the buffer tubes 112 includes a plurality of flexible ribbons 114, the flexible ribbons 114 may be arranged so that they may be conformed together into a single compact core of flexible ribbons, and then wrapped with finished tape 122. Alternatively, each of the flexible ribbons 114 within a buffer tube 112 may be rolled or folded into individual compact cores without finished tape, and then may be further rolled or folded into a single compact unit or bundle and wrapped with finished tape as described in further embodiments below.

Figure 3:
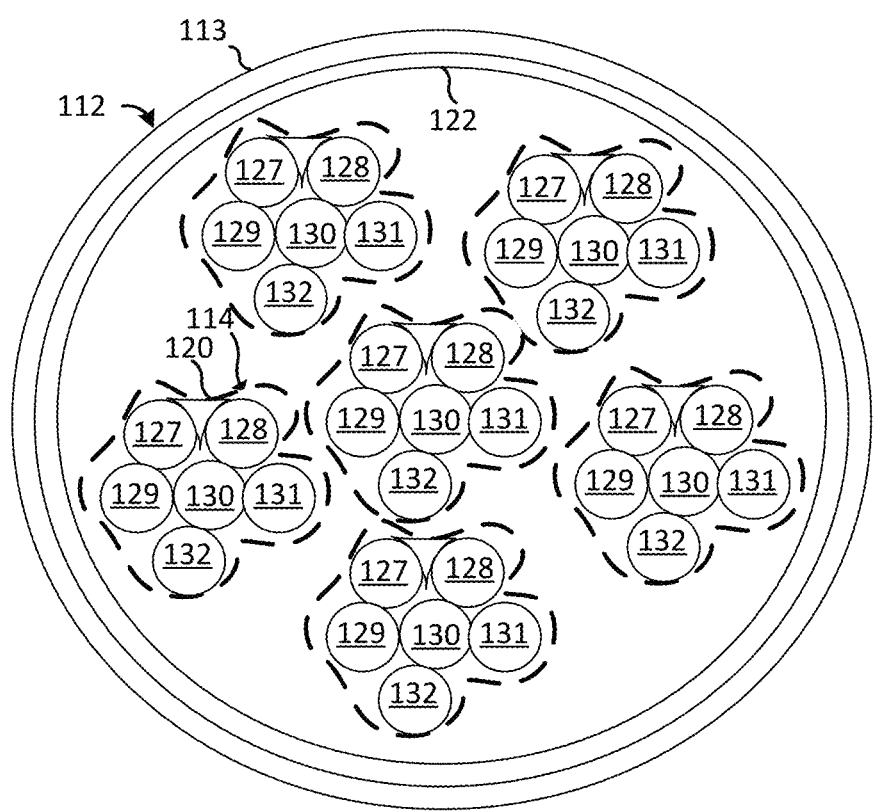
FIG. 3 illustrates a cross-sectional view of a buffer tube after a plurality of flexible ribbons are arranged into a single unit and wrapped in tape in accordance with an embodiment of the present application.

FIG. 3 illustrates a cross-sectional view of a buffer tube after a plurality of flexible ribbons formed in individual compact cores are arranged into a single bundle and wrapped in a finished tape.

Referring to FIG. 3, after each of the flexible ribbons 114 within a buffer tube 112 are rolled or folded together without tape, the plurality of flexible ribbons 114 may be organized into a single compact bundle and wrapped with the finished tape 122. The finished tape 122 may comprise the same material as in the prior embodiment, and may be applied with a thickness, width, and lay-length in the same manner described in FIGS. 1D-1E while adjusting for the larger diameter of the combined flexible ribbons 114. Consequently, each of the individual compact cores of flexible ribbons 114 formed without tape, are brought together as a single compact bundle that are wrapped in finished tape 122 that can be folded or rolled into a compact configuration shown in FIG. 3. As in prior embodiments, individual flexible ribbons can be separated, unfolded or unrolled back into a planar shape after cutting the finished tape.

Figure 4:
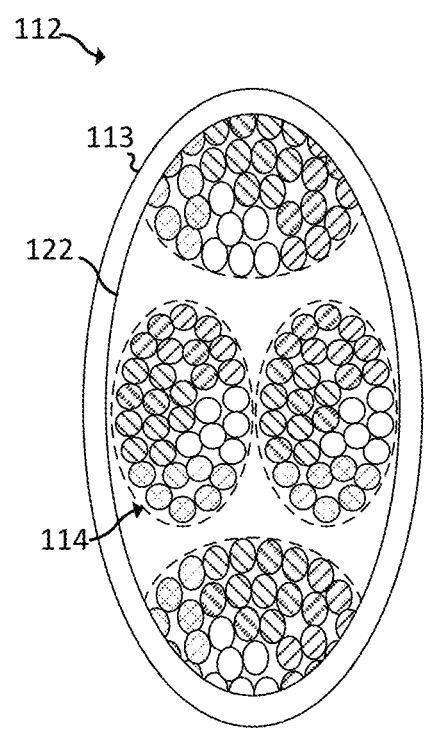
FIG. 4 illustrates a buffer tube formed by wrapping a tape around a plurality of flexible ribbons in a non circular shape in accordance with an embodiment of the present application.

FIG. 4 illustrates a buffer tube formed using a taped single unit of flexible ribbons arranged in individual compact cores in accordance with an embodiment of the present application.

Because of the ability to wrap flexible ribbons using a finished tape, the buffer tubes so formed may be formed in different non circular shapes. For example, cables for certain applications may find it advantageous to have elliptical shape. Only as an illustration, FIG. 4 shows that embodiments of the invention enable formation of the buffer tube having any predetermined shape (elliptical in this case). In addition, as shown in this example, each flexible ribbon within the buffer tube may have a different shape. For example, a few suitable predetermined shapes may be used to minimize voids so as to increase packing density of the optical fibers in some embodiments.

Figure 5:
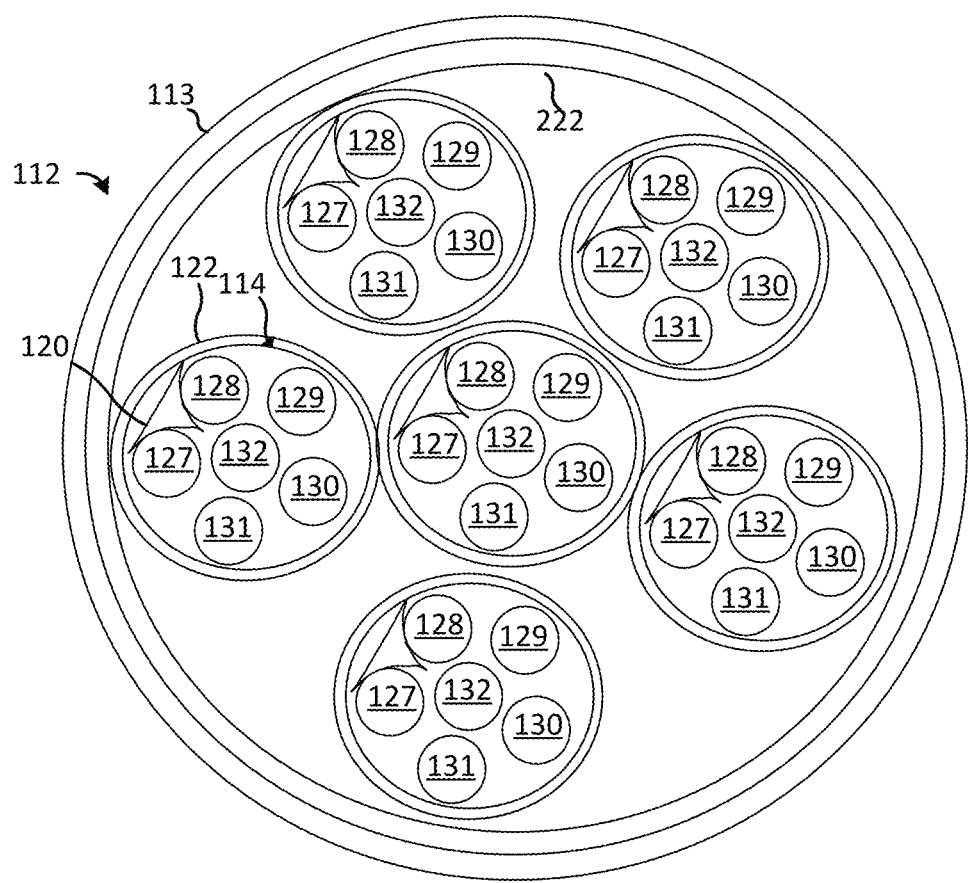
FIG. 5 illustrates a cross-sectional view of the optical cable after each flexible ribbon is taped and arranged into a single unit that is wrapped with an additional tape.

FIG. 5 illustrates a cross-sectional view of the optical cable having taped flexible ribbons that are arranged together and wrapped with additional tape. This embodiment includes an additional tape that wraps a plurality of individually taped flexible ribbons.

Referring to FIG. 5, each flexible ribbon 114 within a buffer tube 112 may be optionally individually wrapped with a finished tape 122 in the manner described in FIGS. 1D-1E. Then the individually taped flexible ribbons 114 may be organized and may be further wrapped with an optional outer tape 222. The finished tape 122 may comprise the same material as in the prior embodiment, and may be applied with a thickness, width, and lay-length in the same manner described in FIGS. 1D-1E while adjusting for the larger diameter of the combined taped flexible ribbons 114. Consequently, each of the flexible ribbons 114 wrapped in the tape 222 is brought together as a single compact unit that is optionally further wrapped in the outer tape 222.

The outer tape 222 may be designed based on the quantity and/or thickness of the plurality of taped flexible ribbons 114. For example, when a large number of flexible ribbons are present, binding them tightly together with an outer tape 222 may be beneficial. In contrast, when the number of flexible ribbons is small, the outer tape 222 may be skipped or applied at a lower tension. Similarly, when each flexible ribbon 114 is thicker (e.g., due to containing more number of optical fibers per each ribbon), the outer tape 222 may be applied at higher tension. Nevertheless, in one or more embodiments, the dimensions of the optional outer tape 222 (i.e. the thickness, width, and lay length) may be selected in the same manner described in FIG. 1D.

Advantageously, individually rolling or folding and taping each of the flexible ribbons 114 prior to organizing them into a single compact unit wrapped in outer tape 222 provides additional strain protection within the buffer tube 112 for extreme situations. However, in one or more embodiments, individually rolling or folding and taping each individual flexible ribbon 114 within a buffer tube 112 may not be preferred because of the higher fabrication costs without a significant improvement in most cases.

Embodiments of the present invention also include a method of forming a buffer tube and an optical cable. As discussed in various embodiments, one or a plurality of flexible ribbons 114 may be wrapped with finished tape 122 as illustrated in FIG. 1D-1E, 1F, 3, 4, or 5 and followed by a extrusion process to form the buffer tube 112. During the buffer tube extrusion process, the taped flexible ribbon(s) 114 is passed through an extrusion cross head and a buffer tube 112 is formed around the taped flexible ribbon(s) 114.

One advantage of this is that the taped flexible ribbon(s) 114 maintain the desired shape and density of the core throughout the buffer extrusion process, promoting the desired shape of the buffer tubes 112.

Example embodiments of the present invention are summarized here. Other embodiments can also be understood from the entirety of the specification and the claims filed herein.

Example 1. An optical cable including: a plurality of buffer tubes, each of the buffer tubes including a flexible ribbon, the flexible ribbon including a plurality of optical fibers, the flexible ribbon being wrapped with a finished tape.

Example 2. The cable of example 1, further including a plurality of flexible ribbons arranged along with the flexible ribbon in a compact core, the finished tape wrapping the compact core.

Example 3. The cable of one of examples 1 or 2, where the finished tape includes aramid.

Example 4. The cable of one of examples 1 to 3, where a thickness of the finished tape is between 0.01 mm and 0.2 mm, where the finished tape is wrapped in a helical manner with a lay length in a range between 10 cm to 100 cm.

Example 5. The cable of one of examples 1 to 4, where the finished tape has a width in the range of 1.5 mm to 5 mm, where the width is in a range of 20 to 40 times greater than the thickness.

Example 6. The cable of one of examples 1 to 5, further comprising a central strength member, wherein the plurality of buffer tubes are arranged in one or a plurality of concentric rows around the central strength member.

Example 7. The cable of one of examples 1 to 6, where the lay-length of the finished tape is between 25 cm to 55 cm.

Example 8. The cable of one of examples 1 to 7, further including a second finished tape wrapping the flexible ribbon.

Example 9. The cable of one of examples 1 to 8, where the second finished tape wraps around the flexible ribbon in an opposite direction to the finished tape.

Example 10. An optical cable includes a plurality of buffer tubes, each of the plurality of buffer tubes includes a plurality of flexible ribbons arranged together in a core, each of the plurality of flexible ribbons including a plurality of optical fibers, an outer finished tape spiraled around an outer surface of the core, and a buffer tube jacket surrounding the outer finished tape.

Example 11. The cable of example 10, where the outer finished tape is an aramid tape and includes aramid filaments arranged in a planar configuration.

Example 12. The cable of one of examples 10 or 11, further including a tape spiraled around each of the plurality of flexible ribbons.

Example 13. The cable of one of examples 10 to 12, where the lay-length of the outer finished tape is between 10 cm to 100 cm.

Example 14. The cable of one of examples 10 to 13, where the outer finished tape has a width and a thickness, where the width is in a range of 20 to 40 times greater than the thickness.

Example 15. The cable of one of examples 10 to 14, further including a central strength member, where the plurality of buffer tubes is arranged in one or a plurality of concentric rows around the central strength member.

Example 16. The cable of one of examples 10 to 15, further including an outer jacket surrounding the plurality of buffer tubes, where the plurality of buffer tubes include a jacket with a deformable material.

Example 17. An optical cable including: a plurality of buffer tubes, each of the plurality of buffer tubes including a plurality of flexible ribbons, each of the flexible ribbons including a plurality of optical fibers; and an aramid finished tape spiraled around an outer surface of a bundle of the plurality of flexible ribbons, where the width of the aramid finished tape is 20 to 40 times greater than the thickness of the aramid finished tape.

Example 18. The cable of example 17, further including a further aramid finished tape spiraled around the outer surface of a bundle of the plurality of flexible ribbons, the further aramid finished tape spiraling in an opposite direction to the aramid finished tape.

Example 19. The cable of one of examples 17 or 18, further comprising an outer jacket surrounding the plurality of buffer tubes, wherein the plurality of buffer tubes comprises a jacket with a deformable material.

Example 20. The cable of one of examples 17 to 19, where the thickness of the aramid tape is between 0.01 mm and 0.2 mm with a lay length in a range between 10 cm to 100 cm.

Example 21. A device includes one or more flexible ribbons comprising a plurality of optical fibers; a finished tape wrapping around the one or more flexible ribbons; and a jacket disposed around the finished tape.

Example 22. The device of example 21, wherein the device is an optical cable, the device further comprising an outer jacket disposed around the jacket.

Example 23. The device of example 22, wherein the outer jacket physically contacts the buffer tube jacket.

Example 24. The device of example 21 to 23, further comprising a further finished tape wrapping around the one or more flexible ribbons, the further finished tape wrapping around in an opposite direction to the finished tape.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical cable comprising:
    a plurality of buffer tubes, each of the buffer tubes comprising:
        a flexible ribbon comprising a plurality of optical fibers;
        a plurality of bond regions formed across the flexible ribbon, wherein neighboring optical fibers are attached to each other using one of the plurality of bond regions; and
        a finished tape wrapped around the flexible ribbon that is configured to maintain mechanical ability of the flexible ribbon to be rolled and folded within each of the plurality of buffer tubes.

2. The optical cable of claim 1, wherein the finished tape is further configured to maintain mechanical ability of the flexible ribbon to be unrolled and unfolded to a planar position for mass fusion splicing of the optical cable.

3. The optical cable of claim 1, wherein the bond regions are arranged across the flexible ribbon in an intermittent manner.

4. The optical cable of claim 1, further comprising a plurality of flexible ribbons arranged along with the flexible ribbon in a compact core within each of the buffer tubes, the finished tape wrapping the compact core.

5. The optical cable of claim 1, wherein the finished tape comprises aramid.

6. The optical cable of claim 1, wherein a thickness of the finished tape is between 0.01 mm and 0.2 mm and wherein the finished tape is wrapped in a helical manner with a lay length in a range between 10 cm to 100 cm.

7. The optical cable of claim 6, wherein the lay length of the finished tape is between 25 cm to 55 cm, and wherein the finished tape has a width in the range of 1.5 mm to 5 mm, wherein the width is in a range of 20 to 40 times greater than the thickness.

8. The optical cable of claim 1, further comprising a central strength member, wherein the plurality of buffer tubes are arranged in one or a plurality of concentric rows around the central strength member.

9. The optical cable of claim 1, further comprising a second finished tape wrapping the flexible ribbon, the second finished tape wrapping around the flexible ribbon in an opposite direction to the finished tape.

10. An optical cable comprising:
a plurality of buffer tubes, each of the buffer tubes comprising:
a plurality of flexible ribbons arranged together in a core, each of the plurality of flexible ribbons comprising a plurality of optical fibers;
a plurality of bond regions formed across each of the flexible ribbons, wherein neighboring optical fibers in each of the flexible ribbons are attached to each other using one of the plurality of bond regions;
an outer finished tape spiraled around an outer surface of the core, the outer finished tape being an aramid tape and comprising aramid filaments arranged in a planar configuration, the outer finished tape being configured to maintain the mechanical ability of the flexible ribbons to be rolled and folded within each of the buffer tubes; and
a buffer tube jacket surrounding the outer finished tape.

11. The optical cable of claim 10, wherein the outer finished tape is configured to maintain the mechanical ability of the flexible ribbons to be unrolled and unfolded to a planar position for mass fusion splicing of the optical cable.

12. The optical cable of claim 10, wherein each flexible ribbon is individually wrapped with an inner finished tape.

13. The optical cable of claim 10, wherein a lay-length of the outer finished tape is between 10 cm to 100 cm.

14. The optical cable of claim 10, wherein the outer finished tape has a width and a thickness, wherein the width is in a range of 20 to 40 times greater than the thickness.

15. The optical cable of claim 10, further comprising a central strength member, wherein the plurality of buffer tubes are arranged in one or a plurality of concentric rows around the central strength member.

16. The optical cable of claim 10, further comprising an outer jacket surrounding the plurality of buffer tubes, wherein the plurality of buffer tubes comprises a jacket with a deformable material.

17. An optical cable comprising:
one or more flexible ribbons comprising a plurality of optical fibers;
a plurality of bond regions formed across each of the one or more flexible ribbons, wherein neighboring optical fibers in each of the flexible ribbons are attached to each other using one of the plurality of bond regions; and
a finished tape wrapping around the one or more flexible ribbons, the finished tape having a width and a thickness, wherein the width is in a range of 20 to 40 times greater than the thickness;
a jacket disposed around the finished tape; and
an outer jacket disposed around the jacket.

18. The optical cable of claim 17, wherein the finished tape is configured to
maintain mechanical ability of the flexible ribbon to be rolled and folded; and
maintain the mechanical ability of the flexible ribbons to be unrolled and unfolded to a planar position for mass fusion splicing.

19. The optical cable of claim 17, wherein the bond regions are arranged across each flexible ribbon in an intermittent manner.

20. The optical cable of claim 17, further comprising a further finished tape wrapping around the one or more flexible ribbons, the further finished tape wrapping around in an opposite direction to the finished tape.

21. The optical cable of claim 17, wherein a thickness of the finished tape is between 0.01 mm and 0.2 mm, and wherein the finished tape is wrapped in a helical manner with a lay length in a range between 10 cm to 100 cm.

22. The optical cable of claim 17, wherein the finished tape conforms to an outer surface of a core formed by the one or more flexible ribbons.

* * * * *